US007272878B2

(12) United States Patent
Dixon

(10) Patent No.: US 7,272,878 B2
(45) Date of Patent: Sep. 25, 2007

(54) CAM ACTUATED CLAMP APPARATUS

(75) Inventor: Robert D Dixon, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/354,776

(22) Filed: Feb. 15, 2006

(65) Prior Publication Data

US 2007/0187881 A1 Aug. 16, 2007

(51) Int. Cl.
*B23P 19/04* (2006.01)

(52) U.S. Cl. ............ 29/263; 269/3; 269/6; 269/254 CS

(58) Field of Classification Search .................. 29/263, 29/281.1; 269/43, 254 CS, 6, 3
See application file for complete search history.

(56) References Cited

U.S. PATENT DOCUMENTS 499,933 A * 6/1893 Phillips ...................... 280/176
1,783,649 A * 12/1930 Howell ........................ 29/263
4,553,294 A * 11/1985 Larsen ........................ 24/489
6,145,823 A * 11/2000 Moushon et al. ....... 269/254 R
6,413,022 B1 7/2002 Sarh
6,755,407 B1 6/2004 Olson et al.
6,832,416 B2 12/2004 Dixon
7,144,003 B1 * 12/2006 Meade ........................ 269/43

* cited by examiner

*Primary Examiner*—Lee D. Wilson
(74) *Attorney, Agent, or Firm*—Harness, Dickey & Pierce, P.L.C.

(57) ABSTRACT

A cam actuating clamp. The clamp has first and second jaws, with one of the jaws including a surface forming a fulcrum and the other one of the jaws including a projecting arm which contacts the fulcrum when the clamp is in an open position. The clamp is moved from a closed to an open position simply by the user grasping an actuating lever that is pivotally secured to one of the jaws and lifting the clamp, in which the weight of the jaws causes rotation of the jaws, relative to the actuating lever, into an open configuration. A pair of springs secured under tension between the jaws hold the jaws in the open position. The jaws are clamped over a work piece by the user moving the actuating lever into a second position. A camming surface on the actuating lever provides an over center action that enables the springs to both assist in opening the clamp as well as closing the clamp depending upon the position of the actuating lever. Since the jaws are not positively attached to one another, the jaws can be expanded to accommodate work pieces of widely varying thicknesses.

20 Claims, 3 Drawing Sheets

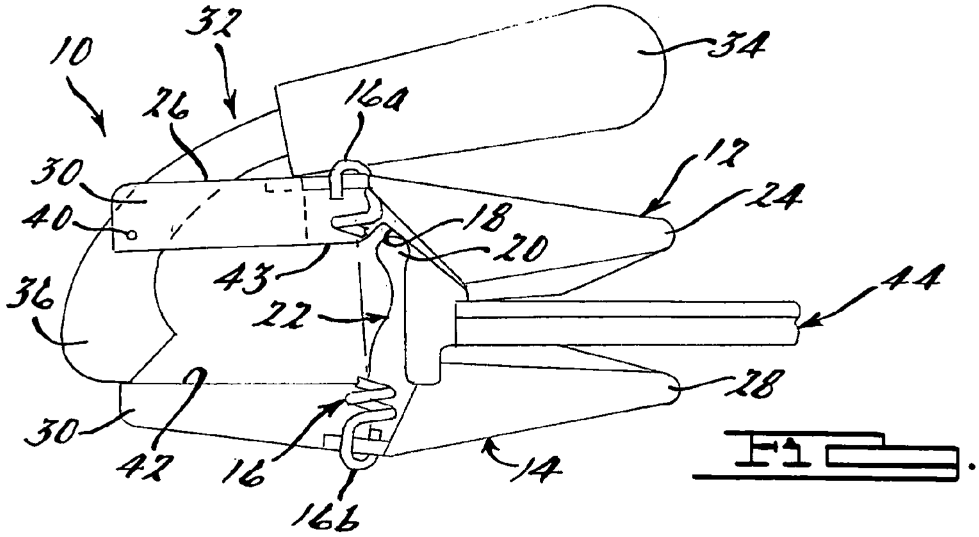
FIG. 7.
FIG. 8.
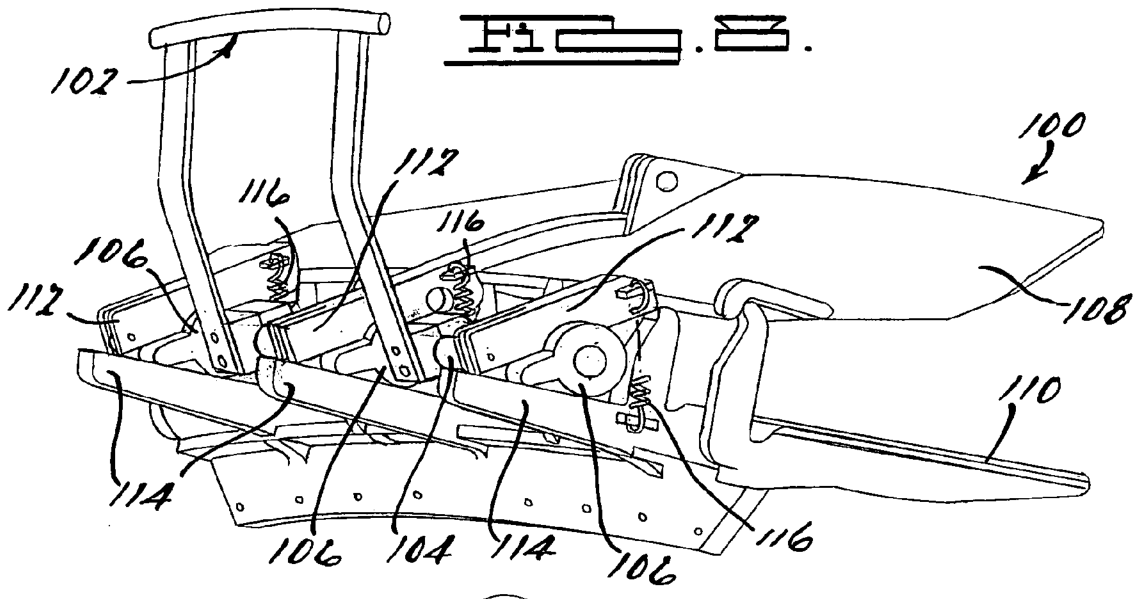
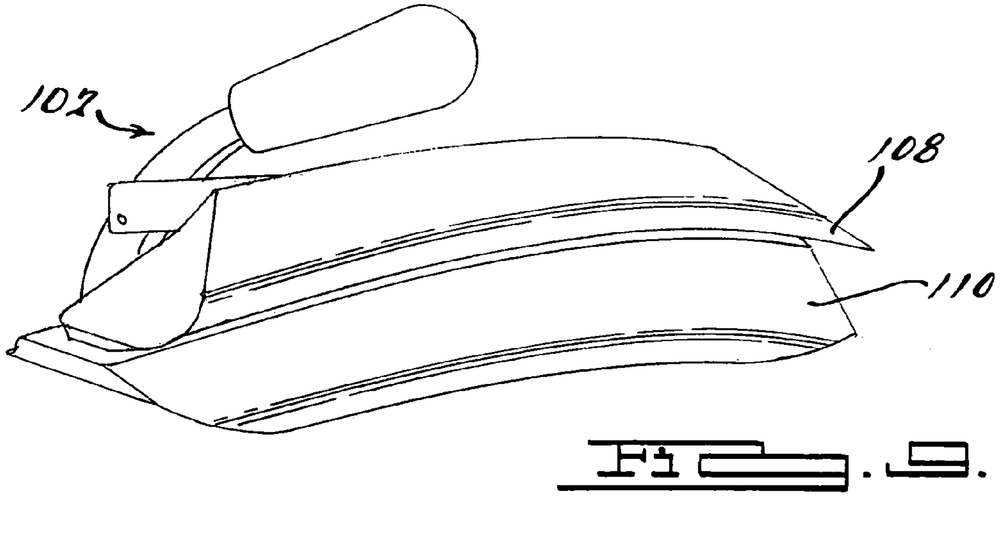
FIG. 9.

CAM ACTUATED CLAMP APPARATUS

FIELD

The present disclosure relates to clamps, and more particularly to a spring clamp that can be used to clamp two work pieces together through a single motion with one hand.

BACKGROUND

Clamping mechanisms are used in a wide variety of applications to clamp two or more work pieces together during various types of manufacturing and assembly operations. One such clamp is often used in the assembly of various components used in commercial and military aircrafts. For example, the construction of interior panels used in commercial aircraft often requires the use of a plurality of clamps to hold two or more panels together during an assembly or manufacturing operation. The clamps often have to be taken off and then placed on work pieces a number of times during the construction process. Thus, with conventional clamps a significant degree of physical effort is often expended by workers simply placing numbers of clamps on to work pieces, and then being required to remove the clamps from the work pieces, then repeating this operation a number of times. The physical effort required to place and remove clamps from the work piece also can add to the overall manufacturing time.

One clamp developed to overcome the above drawbacks is disclosed in U.S. Pat. No. 6,832,416, assigned to the Boeing Company. These clamps make use of a living hinge and a camming number that allows the clamp to be quickly and easily attached to an edge of one or more work pieces with a minimal degree of physical effort by the user.

Nevertheless, it would further be highly desirable to provide a spring clamp that can be opened quickly and easily by the user and placed over the edges of one or more work pieces with a minimal degree of physical effort by the user, and can further accommodate work pieces of significantly varying thicknesses.

SUMMARY

The present disclosure is related to a clamp apparatus that can be easily opened by a user with a single hand, and which can also be placed into a clamped position over one or more work pieces with a single motion of a component on the clamp. The clamp further can accommodate a work piece, or work pieces, having significantly varying thicknesses.

In one form, the clamp includes a first jaw having a fulcrum, and a second jaw having a projecting arm. When the clamp is in a closed configuration without a work piece placed between the jaws, the projecting arm contacts the fulcrum and the first jaw can be rotated about the projecting arm relative to the second jaw. An actuating lever is pivotally coupled to one of the jaws and includes a manually graspable portion and a camming portion. At least one biasing spring is coupled between the two jaws under tension. The clamp may be opened by the user simply grasping the manually engageable proportion and lifting the clamp, in which the weight of the clamp itself enables the jaws to be moved into an open configuration. The jaws may be clamped over one or more work pieces placed there between by the operator simply moving the actuating lever, via the manually graspable portion, into a second position. Since the jaws are not physically coupled together at the area where the projecting arm contacts the fulcrum, the jaws being held to one another only by the biasing spring, the jaws can be separated away from one another to a greater degree to accommodate work pieces having significantly varying thickness. The amount of effort required to move the actuating lever between its first and second positions is relatively small, thus enabling the user to place the clamp in its clamped and unclamped orientations with a minimal degree of physical effort.

In one embodiment the actuating lever includes a plurality of spaced apart camming lobes. In another embodiment the jaws include jaw portions that have a common arcuate shape so as to be able to engage one or more arcuately shaped work pieces.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a side view of the clamp in FIG. 6 but showing the clamp in a closed position clamping a pair of edges of a corresponding pair of work pieces:

FIG. 8 is a rear perspective view of an alternative preferred form of the clamp that makes use of an actuating lever having a plurality of spaced apart camming lobes and a pair of widened jaws; and FIG. 9 is a front perspective view of the clamp of FIG. 8.

DETAILED DESCRIPTION

The following description of various embodiment(s) is merely exemplary in nature and is in no way intended to limit the invention, its application, or uses.

Figure 1:
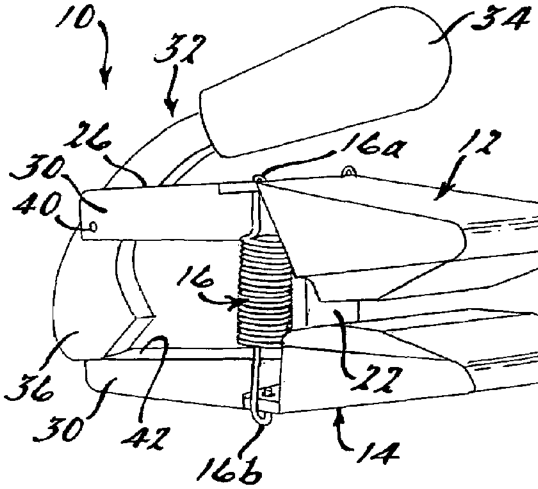
FIG. 1 is a front perspective view of a clamp in accordance with a preferred embodiment in the present invention.
Figure 2:
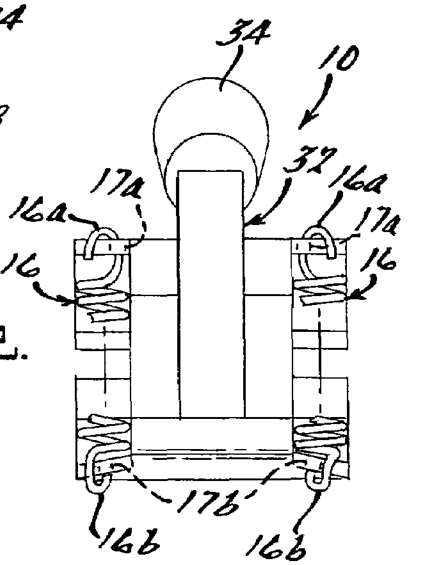
FIG. 2 is a rear view of the clamp in FIG. 1.
Figure 3:
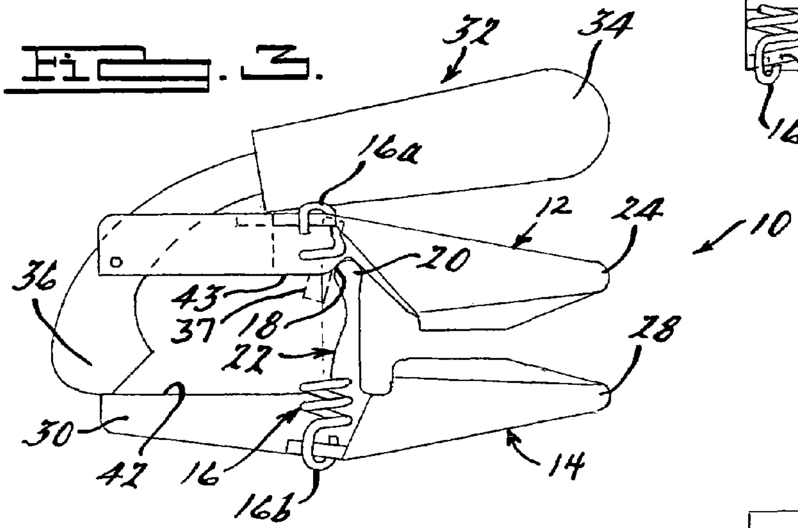
FIG. 3 is a side view of the clamp in FIG. 1 in the closed position, but without a work piece placed between the jaws of the clamp.
Figure 5:
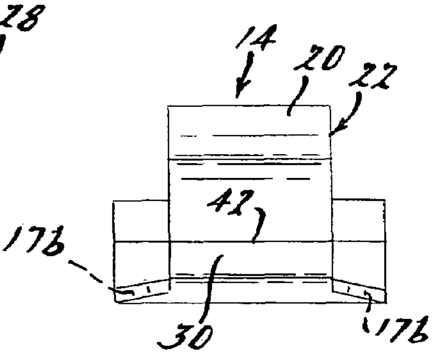
FIG. 5 is a rear view of just the lower jaw.

Referring to FIGS. 1-3, there is shown an embodiment of a clamp 10. The clamp 10 includes a first jaw 12, a second jaw 14, and at least one spring 16 coupled under tension to the jaws 12 and 14 via end portions **16*a* and 16*b* of the spring that extend through holes 17*a* and 17*b* in the jaws 12 and 14. In this example a pair of springs 16 are illustrated, but it will be appreciated that a single spring could be included with only minor modifications to the embodiments shown in FIG. 1. Such modifications would involve locating the spring along a mid point of the jaws 12 and 14** and selecting a spring constant necessary to provide the biasing force needed for the anticipated clamping operations.

The first jaw 12 of the clamp 10 also includes a fulcrum 18 that contacts a distal end 20 of a projecting arm 22 of the second jaw 14. The projecting arm 22 is also shown in FIG.

Figure 4:
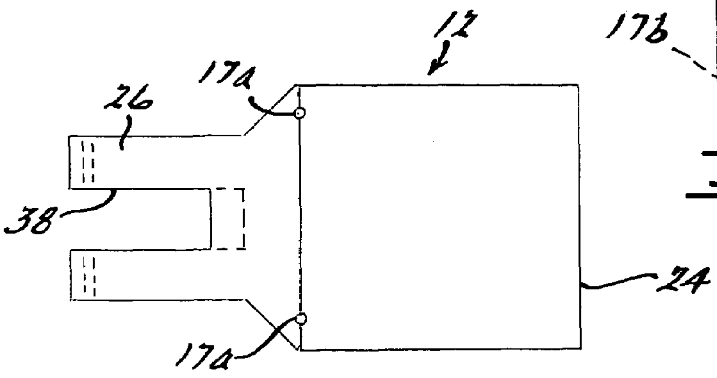
FIG. 4 is a plan view of just the upper jaw of the clamp of FIG. 1.

5. Jaw 12 further includes a jaw portion 24 and an end portion 26, while the second jaw 14 includes jaw portion 28 and second end portion 30. An actuating lever 32 has a manually graspable portion 34 and a cam lobe 36. The actuating lever 32 is positioned partly within a notched area 38 (shown also in FIG. 4) of the first jaw 12 and is pivotally coupled to the first jaw 14 via a pivot pin 40 that extends through portions of the first jaw 12 and through the actuating lever 32. The actuating lever 32 is coupled to the first jaw 12 such that the manually graspable portion 34 projects outwardly from the first jaw 12, and such that the cam lobe 36 is positioned generally between the end portions 26 and 30 of the jaws 12 and 14, respectively, and such that the cam lobe 36 is in contact with an inner surface 42 of the second jaw 14.

Referring to FIG. 3, clamp 10 is shown in a closed position but without a work piece, or work pieces, positioned between the jaws 12 and 14. Since the springs 16, which in this example are coil springs, are coupled under tension between the jaws 12 and 14, the distal portion 20 of the projecting arm 22 is held in contact with the fulcrum 18. The fulcrum 18 essentially forms a groove extending along the width of an inner surface 43 of the jaw 12, while the projecting arm 22, in this embodiment extends along the full width of the second jaw 14. The springs 16 are coupled at longitudinal points along each of the jaws 12 and 14 that are in between the fulcrum 18 and the end portion 26, and in between the projecting arm 22 and the end portion 30, but adjacent the fulcrum 18. Cam lobe 36 is shaped such that a slight over center action occurs when the actuating lever 32 is moved between a closed position, shown in FIG. 3, and an open position shown in FIG. 6. The springs 16 provide a small degree of force to urge the end portions 26 and 30 towards one another, to thus hold the actuating lever 32 in the position shown in FIG. 6, once a predetermined point of travel is moved past when the user is rotating the actuating lever 32 in a counter-clockwise direction in the drawing of FIG. 6. Optionally, a pin 37 could be inserted through the jaw 1 adjacent to the fulcrum 18. This would effectively "deepen" the fulcrum and limit any tendency of the jaw 12 to slide forwardly, relative to jaw 14, when the fulcrum 18 is out of contact with the distal end 20 of the projecting arm 22 while clamping a thick workpiece.

Figure 6:
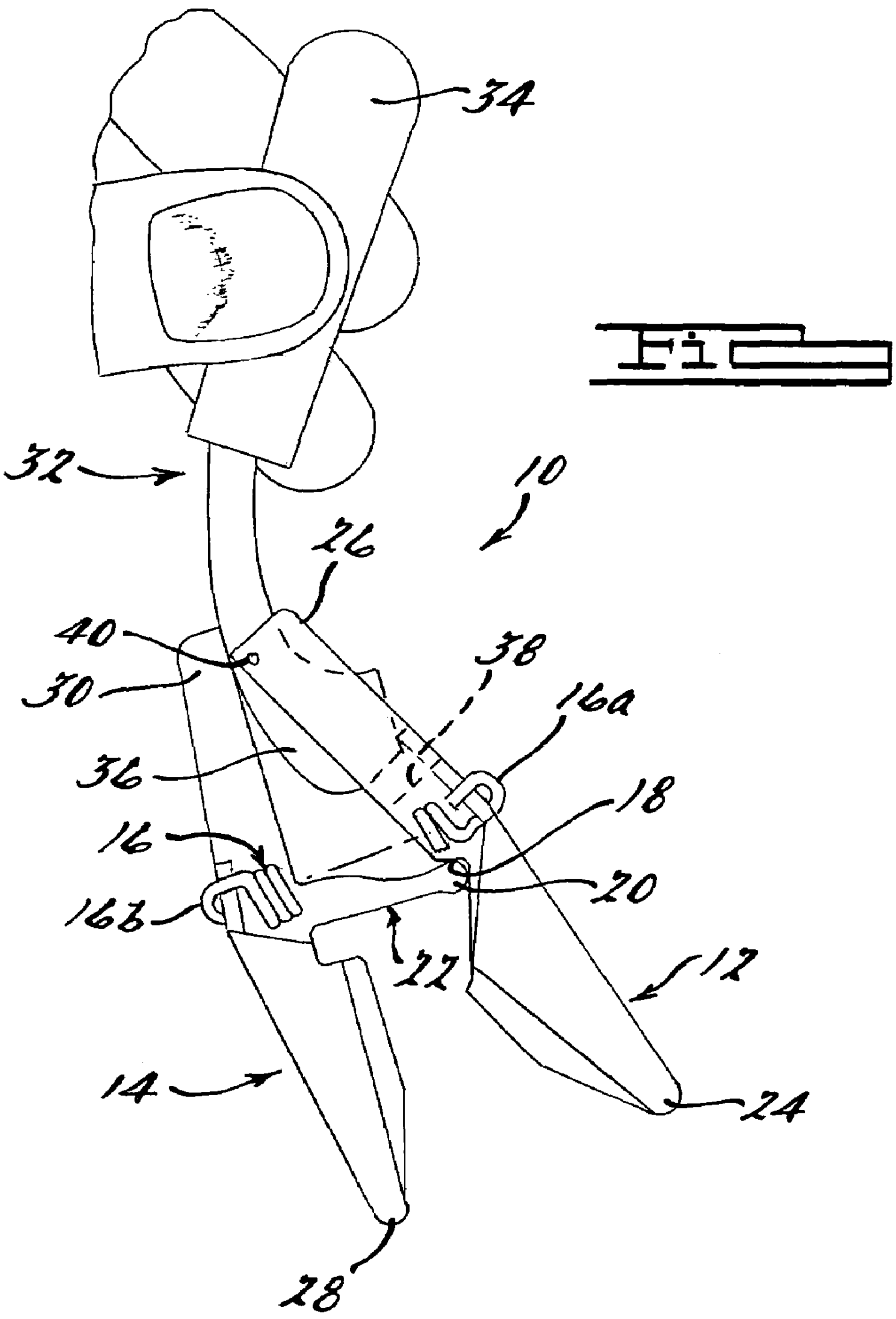
FIG. 6 is a side view with the jaws in the opened position illustrating how a user may open the clamp with a single hand simply by lifting the clamp from the actuating lever.

Referring further to FIG. 6, to move the clamp 10 into an open position, the user merely grasps the manually graspable portion 34 and lifts the clamp 10. The weight of the jaws 12 and 14, taken with the coupling of the actuating lever 32 at the end portion 26 of the first jaw 12, enables the springs 16 to help assist moving the jaws 12, 14 into an open configuration as the actuating lever 32 is rotated in a counter-clockwise direction in FIG. 6, relative to the jaws 12 and 14. Thus, the operation of opening the clamp 10 is extremely easy for the user, since the clamp opens essentially automatically due to its own weight when the operator lifts the clamp while holding the manually graspable portion 34.

Referring to FIG. 7, the clamp 10 is illustrated in a clamped configuration holding a pair of work pieces 44 clamped against one another. The user places the clamp 10 in the orientation shown in FIG. 7 by initially placing the work piece, or work pieces 44, between the jaw portions 24 and 28. The length of the projecting arm 22 is such that at least a minimum predetermined width opening is provided when the clamp 10 is in its open configuration (FIG. 6). However, since the upper and lower jaws 12, 14 are not positively coupled together via a fixed link or fixed component, the jaws 12 and 14 may still be spread apart from one another if a work piece or work pieces having an overall thickness that is greater than the spacing between the jaws needs to be clamped. Essentially, the first jaw 12 can be viewed as "floating" relative to the second jaw 14 because of the abutting contact of the distal portion 20 and the fulcrum 18. This enables an even wider degree of adjustability of the clamp 10 to accommodate an even wider range of thicknesses of work pieces that require clamping.

Referring further to FIG. 7, the clamp is secured to the work piece by placing the work piece between the jaws 12 and 14 and then merely rotating the actuating lever 32 clockwise in the drawing of FIG. 7. This essentially is a pushing motion which rotates the actuating lever 32 to cause the cam lobe 36 to spread apart the end portions 26 and 30 of the jaws 12 and 14, respectively. The springs 16 provide a biasing force that not only helps to hold the actuating lever 34 in the position shown in FIG. 7, but also jaws 12 and 14 under tension over the opposite surfaces of the work pieces 44. The shape of the cam lobe 36, taken in connection with the tension force provided by the springs 16, enables an on-center, or slightly over-center action to be achieved when moving the actuating lever 32 into the position shown in FIG. 7. When the actuating lever 32 is moved counter-clockwise in the drawing of FIG. 3 past a predetermined point, the spring 16 begins to assist opening of the jaws 12 and 14. When the actuating lever 32 is moved in a clockwise direction to, or just slightly past, a predetermined point, the springs 16 then operate to assist in holding the actuating lever 32 in the position shown in FIG. 6.

The degree of clamping force provided can be controlled by selecting springs 16 having desired spring constants. The shape of the cam lobe 36 and the spring constant selected can be such to enable the clamp 10 to be unclamped from the workpiece(s) 44 simply by shaking the work piece(s) slightly, or even by holding the workpiece(s) at an angle that allows gravity to pull the actuating lever 32 into the open position. In this manner, a plurality of the clamps 10 can be quickly removed simultaneously from the workpiece(s) 44. Of course, if a high degree of clamping force is required, then a suitable spring constant can be selected to achieve the needed clamping force.

The jaw portions 12 and 14 may be made of any suitable material such as aluminum, steel, high strength plastic, etc. The actuating lever 32 may be made from similar materials.

Referring to FIGS. 8 and 9, a clamp 100 in accordance with an alternative embodiment is illustrated. The clamp 100 is constructed along the same principles as the clamp 10 but includes an actuating lever 102 having an elongated shaft 104 with a plurality of spaced apart camming portions 106 affixed thereto. Jaw portions 108 and 110 are also elongated, and the camming portions 106, due to being spaced apart, enable a uniformed force to be applied to end portions 112 and 114 of jaws 108 and 110 during opening and closing movements of the clamp 100. In this embodiment, multiple springs 116 may also be incorporated to provide a uniform clamping force.

With further reference to FIG. 9, the jaws 108 and 110 have a common arcuate shape that better allows the jaws to grasp onto a work piece having an arcuate shape. Thus, if the curvature of the work piece is known in advance, the jaws 108 and 110 could be formed with a similar or identical curvature to even more effectively clamp the work piece (or work pieces) between the jaws 108 and 110. Also while the jaws 12 and 14 of the clamp 10 have been illustrated as having flat surfaces along the jaw portions 24 and 28, it should be appreciated that the jaw portions 24 and 28 could also be formed with a common arcuate shape, or even a different non-planar shape, to even more effectively clamp a work piece.

The various embodiments described herein all provide a clamp that can be opened automatically simply by the user grasping a portion of an actuating lever and lifting the clamp into position to be placed on a work piece or work pieces that need to be clamped together. The clamps described herein can also be closed through a single rotational movement of the actuating lever with a single hand of the user once the work piece, or work pieces, have been placed between the jaws of the clamp. This enables the clamp to be quickly and easily secured over a work piece, as well as quickly and easily removed from the work piece with a minimal effort in both the clamping and unclamping movements performed by the user. This enables each of the clamps described herein to be more quickly and easily attached to a work piece, as well as more quickly removed from the work piece.

While various embodiments have been described, those skilled in the art will recognize modifications or variations which might be made without departing from the inventive concept. Therefore, the description and claims should be interpreted liberally with only such limitation as is necessary in view of the pertinent prior art.

What is claimed is:

1. A clamp comprising:

a first independent jaw having a fulcrum area and a first jaw portion;

a second independent jaw formed separately from said first independent jaw, having a projecting arm and a second jaw portion, the projecting arm being able to contact the fulcrum area of said first independent jaw but free to enable said jaws to be separated and detached from one another such that said fulcrum is moved out of contact with said projecting arm;

at least one spring coupled to portions of said first and second jaws adjacent said fulcrum to hold said projecting arm and said fulcrum in contact with one another, and tending to continuously draw said fulcrum and said projecting arm into contact with one another after said fulcrum and said projecting arm have been separated from contact with one another;

an actuating lever having a cam lobe and a manually graspable portion, the actuating lever being pivotally coupled to one of said jaws; and the cam lobe and said spring enabling said jaw portions to be urged away from each other into an open configuration when the actuating lever is moved to a first position via said manually graspable portion, and towards each other into a clamping configuration when the actuating lever is moved to a second position.

2. The clamp of claim 1, wherein said cam lobe and said spring provide an over center action so that grasping said clamp by said manually graspable portion and lifting said clamp automatically operates to pivot said actuating lever to urge said jaws into said open configuration.

3. The clamp of claim 1, wherein said projecting arm has a distance that defines a minimum predetermined spacing between said jaws when said jaws are in said clamping configuration but not clamped onto an external component.

4. The clamp of claim 1, wherein said fulcrum area comprises a groove formed in said first jaw.

5. The clamp of claim 1, wherein said at least one spring comprises a pair of springs coupled under tension to said jaws, adjacent said projecting arm.

6. The clamp of claim 1, wherein said jaw portions have a common arcuate shape.

7. The clamp of claim 1, wherein said spring is coupled to said second jaw at a point on said second jaw that is between said projecting arm and an end of said second jaw opposite to said jaw portion of said second jaw.

8. The clamp of claim 1, wherein said spring and said cam lobe provide an over center action that assists in holding said actuating lever in said first position and in said second position.

9. The clamp of claim 1, wherein said spring comprises a coil spring coupled under tension to said jaws.

10. A clamp comprising:

a first independent jaw having a fulcrum area and a first jaw portion;

a second independent jaw formed separately from said first independent jaw, and having a projecting arm and a second jaw portion, the projecting arm being able to contact the fulcrum area but free to move away from the fulcrum area, said second jaw being formed as an independent component so that said jaws are able to be moved apart from and out of contact with one another so that said fulcrum is lifted off of said projecting arm;

a pair of springs coupled under tension to portions of said first and second jaws adjacent said fulcrum to hold said projecting arm in abutting contact with said fulcrum, and further tending to continuously bias said projecting arm and said fulcrum back into contact with one another when said fulcrum and said Projecting arm are out of contact with one another;

an actuating lever having a cam lobe and a manually graspable portion, the actuating lever being pivotally coupled to one of said jaws such that the cam lobe is disposed between an end portion of each of said jaw portions, and said manually graspable portion extends outwardly of said one jaw;

said cam lobe and said spring enabling said jaw portions:

to be urged away from each other into an open configuration when the actuating lever is moved rotationally in a first direction to a first position via said manually graspable portion, which causes said cam lobe to rotate in a first direction to allow said end portions to be moved toward each other; and to be urged into a clamping configuration when said actuating lever is moved rotationally in a second direction opposite to said first direction, into a second position.

11. The clamp of claim 10, wherein said jaw portions have a common arcuate shape.

12. The clamp of claim 10, wherein said springs comprise coil springs.

13. The clamp of claim 10, wherein said cam lobe and said springs are arranged to provide an over center biasing action that operates to urge said actuating lever into each of said positions, depending on a rotational position of said actuating lever.

14. The clamp of claim 10, wherein said actuating lever includes a plurality of camming lobes spaced apart along a longitudinal path, for engaging with said end portions.

15. The clamp of claim 10, wherein said fulcrum comprises a groove that a distal portion of said projecting arm engages in.

16. The clamp of claim 10, wherein said jaws can be urged into said open configuration by a user grasping said manually engageable portion with one hand and lifting said clamp, wherein the weight of said clamp assists in moving said jaws to said open configuration.

17. A clamp comprising:

a first independent jaw having a fulcrum area and a first jaw portion;

a second independent jaw formed separately from said first independent jaw, having a projecting arm and a second jaw portion, the projecting arm being able to contact the fulcrum area but free to move away from, and out of contact with, the fulcrum area to a degree that the fulcrum is able to be lifted off of the projecting arm;

a pair of springs coupled under tension to portions of said first and second jaws adjacent said fulcrum to hold a distal end of said projecting arm against said fulcrum area, and to apply a biasing force that tends to urge said fulcrum back into contact with said projecting arm when said fulcrum and said projecting arm are out of contact with one another;

an actuating lever having a cam lobe and a manually graspable portion, the actuating lever being pivotally coupled to one of said jaws such that the cam lobe is disposed between end portion of each of said jaw portions, and said manually graspable portion extends outwardly of said one jaw;

said cam lobe and said spring enabling said jaw portions to be urged away from each other into an open configuration when the actuating lever is used to lift and suspend said clamp, said lifting enabling said actuating lever to be moved rotationally in a first direction to a first position using the weight of said clamp; and said cam lobe enabling said jaws to be held in a clamping configuration when a work piece is positioned between said jaws and said actuating lever is moved rotationally in a second direction opposite to said first direction, into a second position.

18. The clamp of claim 17, wherein said springs comprise coil springs.

19. The clamp of claim 17, wherein said jaws each have a common arcuate shape.

20. The clamp of claim 17, wherein said springs and said cam lobe enable an over center action to be implemented to assist in urging said actuating lever into both of said first and second positions.

* * * * *